US012313932B2

(12) United States Patent
Ota

(10) Patent No.: US 12,313,932 B2
(45) Date of Patent: May 27, 2025

(54) ILLUMINATION DEVICE AND DISPLAY DEVICE

(71) Applicant: Japan Display Inc., Tokyo (JP)

(72) Inventor: Takashi Ota, Tokyo (JP)

(73) Assignee: Japan Display Inc., Tokyo (JP)

( * ) Notice: Subject to any disclaimer, the term of this patent is extended or adjusted under 35 U.S.C. 154(b) by 46 days.

(21) Appl. No.: 18/200,098

(22) Filed: May 22, 2023

(65) Prior Publication Data

US 2023/0296938 A1 Sep. 21, 2023

Related U.S. Application Data

(63) Continuation of application No. 17/894,249, filed on Aug. 24, 2022, now Pat. No. 11,698,552, which is a continuation of application No. PCT/JP2021/004902, filed on Feb. 10, 2021.

(30) Foreign Application Priority Data

Feb. 26, 2020 (JP) .................................. 2020-030696

(51) Int. Cl.
 *G02F 1/13357* (2006.01)
 *G02F 1/1335* (2006.01)
(52) U.S. Cl.
 CPC .. *G02F 1/133603* (2013.01); *G02F 1/133607* (2021.01); *G02F 1/133614* (2021.01)
(58) Field of Classification Search
 CPC ......... G02F 1/133603; G02F 1/133614; G02F 1/133607
 See application file for complete search history.

(56) References Cited

U.S. PATENT DOCUMENTS

2011/0012141 A1* 1/2011 Le Toquin ............ H01L 33/502
 257/E33.059
2015/0036317 A1 2/2015 Yamamoto et al.

FOREIGN PATENT DOCUMENTS

| CN | 104344287 A | * | 2/2015 | .............. F21V 13/02 |
| JP | 2020187982 A | * | 11/2020 | ....... G02F 1/133603 |
| WO | WO2011/025172 A2 | | 3/2011 | |

OTHER PUBLICATIONS

Office Action issued in related Chinese Patent Application No. 202180016887.1 on Jun. 14, 2023. 8 pages.

* cited by examiner

*Primary Examiner* — Lucy P Chien
(74) *Attorney, Agent, or Firm* — K&L Gates LLP

(57) ABSTRACT

According to one embodiment, an illumination device comprises a plurality of light emitting elements that are disposed on a main surface of a wiring board, a light diffusion distance maintaining layer, a wavelength conversion layer, and a prism sheet, wherein the main surface of the wiring board is divided into a plurality of segment regions, n (n>1) light emitting elements are provided in each of the segment regions, the light emitting elements are independently driven in units of the segment regions, and a thickness of the light diffusion distance maintaining layer is ½ times or more a pitch of the segment regions adjacent to each other.

20 Claims, 5 Drawing Sheets

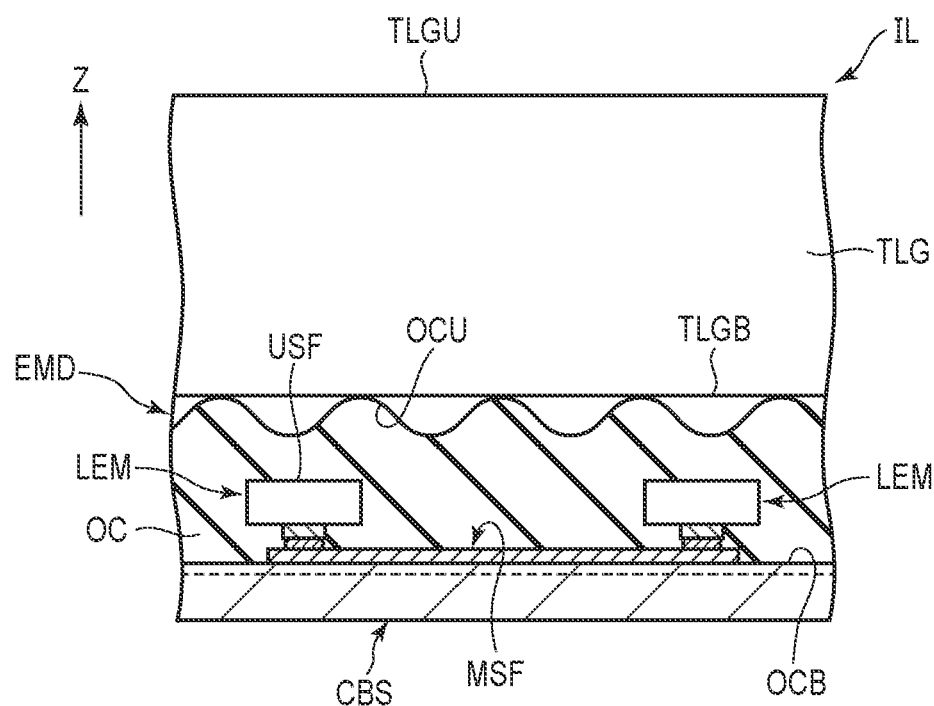
F I G. 6
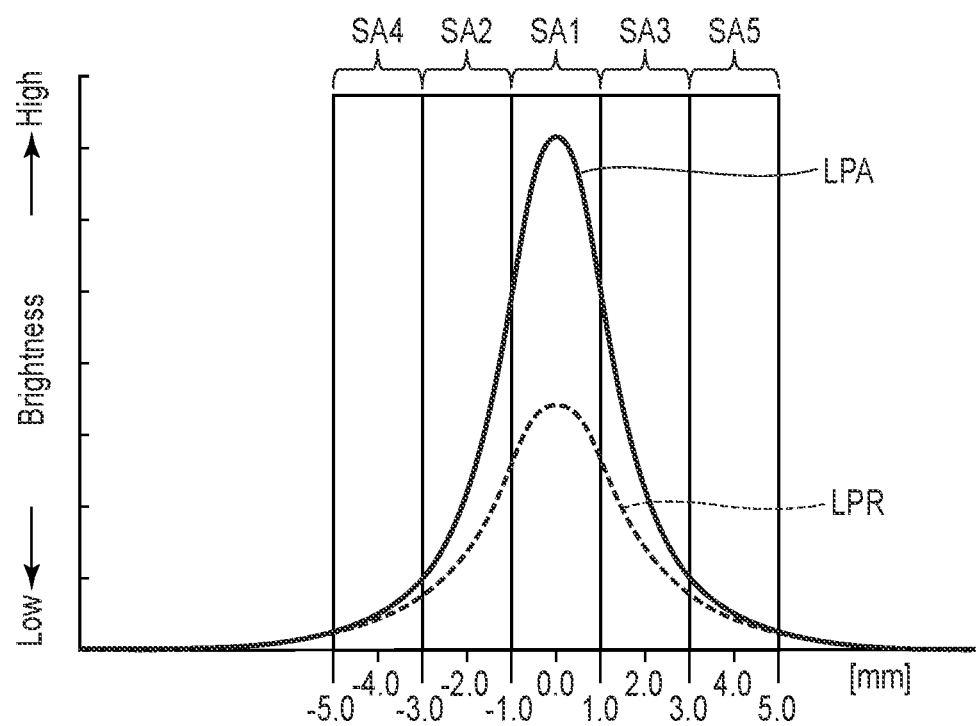
F I G. 7

ILLUMINATION DEVICE AND DISPLAY DEVICE

CROSS-REFERENCE TO RELATED APPLICATIONS

This application is a continuation application of U.S. patent application Ser. No. 17/894,249, filed Aug. 24, 2022, which is a continuation application of PCT Application No. PCT/JP2021/004902, filed Feb. 10, 2021, and based upon and claiming the benefit of priority from Japanese Patent Application No. 2020-030696, filed Feb. 26, 2020, the entire contents of all of which are incorporated herein by reference.

FIELD

Embodiments described herein relate generally to an illumination device and a display device.

BACKGROUND

In recent years, a liquid crystal display device using a liquid crystal panel for display has been known as a display device mounted on a television, an information device, or the like. For the display quality of such a liquid crystal display device, there is an increasing demand for increase in the brightness of an illumination device used in the liquid crystal display device, and a direct type illumination device in which a light source is disposed directly under a liquid crystal panel with a light guide interposed therebetween has been studied.

BRIEF DESCRIPTION OF THE DRAWINGS

FIG. 6 is a cross-sectional view showing another configuration example of a protective layer OC.

FIG. 7 is a diagram showing brightness profiles of an illumination device IL of the present example and an illumination device of a comparative example.

DETAILED DESCRIPTION

Figure 1:
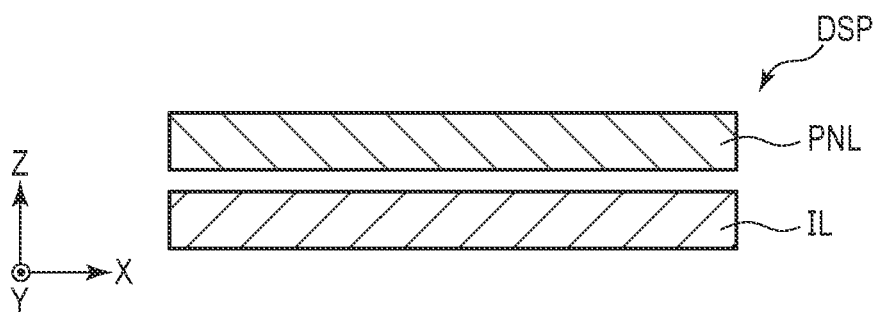
FIG. 1 is a block diagram showing a display device DSP according to the present embodiment.

In general, according to one embodiment, an illumination device comprises a wiring board; a plurality of light emitting elements that are disposed on a main surface of the wiring board; a light diffusion distance maintaining layer that is provided above the light emitting elements; a wavelength conversion layer that is provided above the light diffusion distance maintaining layer; and a prism sheet that is provided above the wavelength conversion layer, wherein the main surface of the wiring board is divided into a plurality of segment regions, n (n>1) light emitting elements are provided in each of the segment regions, the light emitting elements are independently driven in units of the segment regions, and a thickness of the light diffusion distance maintaining layer is ½ times or more a pitch of the segment regions adjacent to each other.

The present embodiment provides an illumination device with improved illumination quality and a display device including the illumination device.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

An illumination device and a display device according to an embodiment will be described hereinafter with reference to the accompanying drawings.

In the following descriptions, a first direction X, a second direction Y and a third direction Z are orthogonal to each other, but may intersect at an angle other than ninety degrees. A direction forwarding a tip of an arrow indicating the third direction Z is defined as "upward" or "above" and a direction forwarding oppositely from the tip of the arrow is referred to as "downward" or "below".

With such expressions "a second member above a first member" and "a second member below a first member", the second member may be in contact with the first member or may be remote from the first member. In the latter case, a third member may be interposed between the first member and the second member. On the other hand, with such expressions "a second member on a first member" and "a second member on a first member", the second member is meant to be in contact with the first member.

In addition, it is assumed that there is an observation position to observe the semiconductor substrate on a tip side of an arrow in a third direction Z, and viewing from this observation position toward the X-Y plane defined by the first direction X and the second direction Y is referred to as a planar view.

Embodiment

FIG. 1 is a block diagram showing a display device DSP according to the present embodiment.

The display device DSP includes a display panel PNL and an illumination device IL. In the present embodiment, the display panel PNL is a generally known transmissive or transflective liquid crystal display panel. Note, however, that the display panel PNL is not limited to the liquid crystal display panel, and may be a display panel that requires a separate light source, such as a display panel of a micro-electromechanical systems (MEMS).

The illumination device IL is disposed under and opposed to the display panel PNL. The illumination device IL releases light toward the display panel PNL. In the present embodiment, the illumination device IL functions as a backlight unit. The display panel PNL selectively transmits light from the illumination device IL to display an image.

Figure 2:
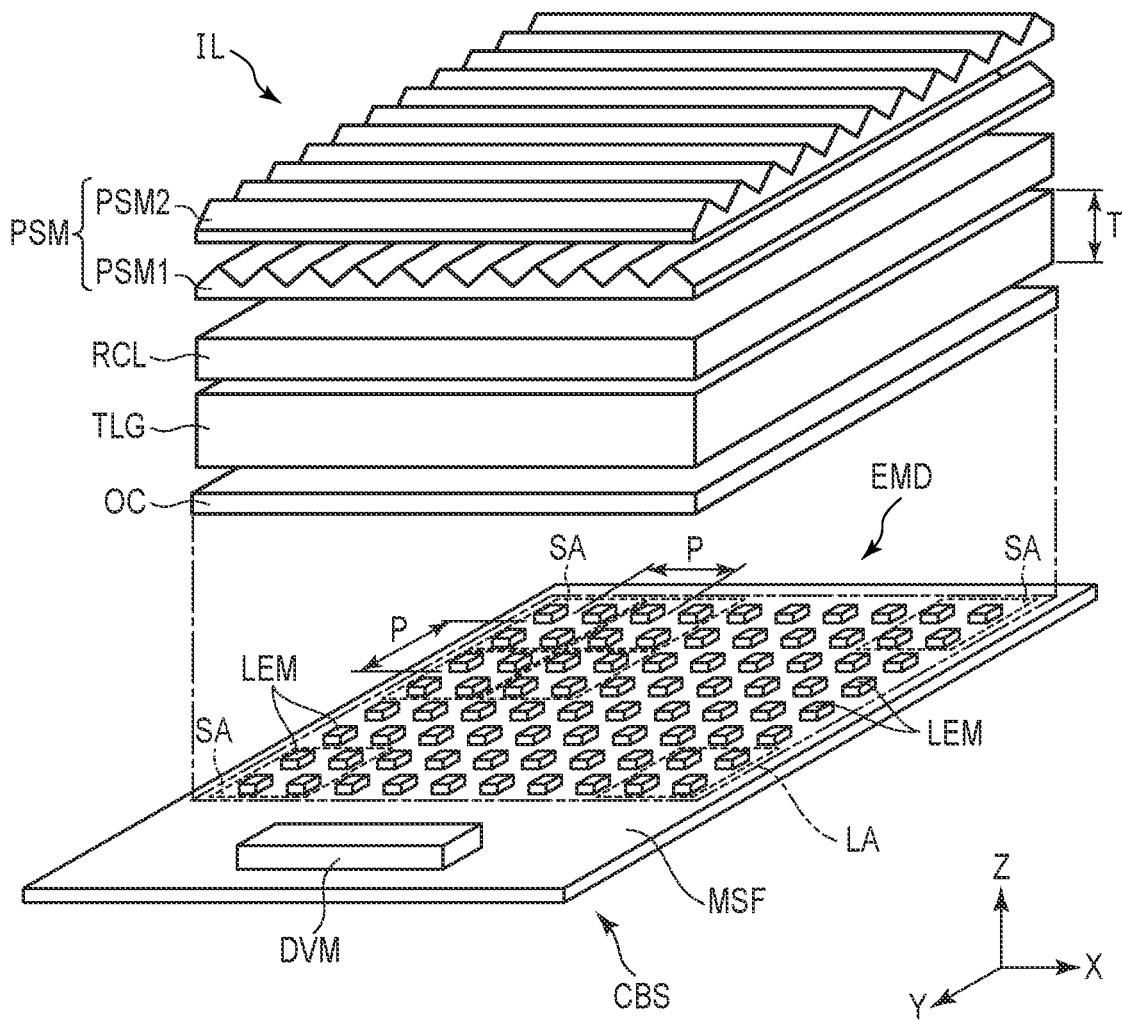
FIG. 2 is an exploded perspective view showing an illumination device IL shown in FIG. 1.
Figure 3:
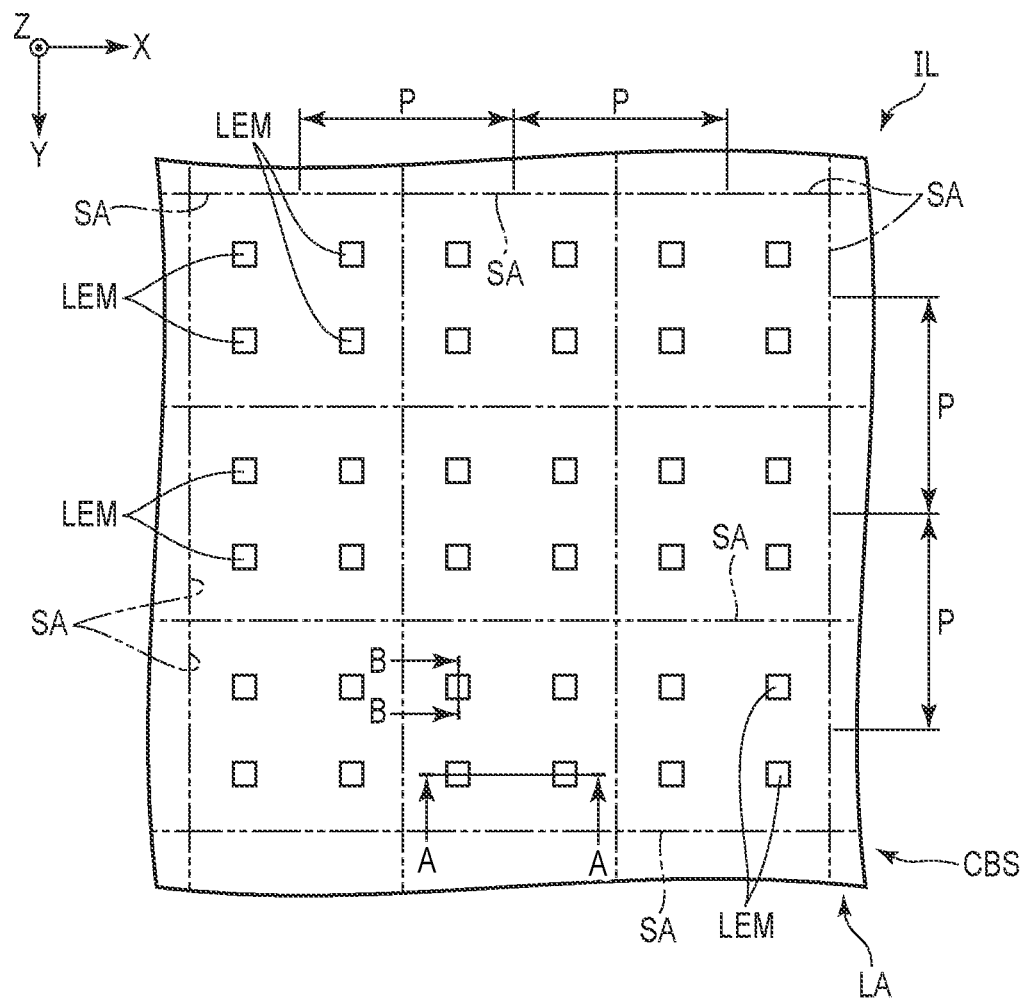
FIG. 3 is a plan view showing a part of the illumination device IL according to the present embodiment.

FIG. 2 is an exploded perspective view showing the illumination device IL shown in FIG. 1. FIG. 3 is a plan view showing a part of the illumination device IL according to the present embodiment.

As shown in FIG. 2, the illumination device IL includes a wiring board CBS, a plurality of light emitting elements LEM, a driver DVM, a protective layer OC, a light diffusion distance maintaining layer TLG, a wavelength conversion layer RCL, and a prism sheet PSM. The wiring board CBS, the plurality of light emitting elements LEM, the protective layer OC, the light diffusion distance maintaining layer TLG, the wavelength conversion layer RCL, and the prism sheet PSM are stacked in this order in the third direction Z.

In the present embodiment, the wiring board CBS includes a printed circuit board (PCB). Note, however, that the wiring board CBS is not limited to the printed circuit board, and may include a flexible printed circuit (FPC).

The wiring board CBS has a main surface MSF, and also has a light emission region LA on the main surface MSF. The light emission region LA is opposed to at least a display region of the display panel (PNL).

The plurality of light emitting elements LEM are mounted on the main surface MSF of the wiring board CBS. In the present embodiment, the light emitting element LEM is a mini LED (mini light-emitting diode). On the main surface MSF, the driver DVM that drives the plurality of light emitting elements LEM is mounted outside the light emission region LA.

The light emitting element LEM outputs light having a specific wavelength, and the wavelength conversion layer RCL converts the wavelength of the light emitted from the light emitting element LEM and outputs the converted light.

In planar view, the light emitting element LEM has a square shape. Note, however, that the shape of the light emitting element LEM may be a shape other than a square, such as a rectangle. In planar view, the length of one side of the light emitting element LEM which is a mini LED is, for example, more than 100 μm and less than 300 μm. The length of one side of the light emitting element LEM which is a mini LED may be more than 100 μm and 200 μm or less.

Incidentally, the light emitting element LEM may be, as an LED smaller in size than the mini LED, a micro LED in which the length of the longest side is 100 μm or less. Alternatively, the light emitting element LEM may be an LED in which the length of the longest side is 1 mm or less. Alternatively, the light emitting element LEM may be, as a general LED larger in size than the mini LED, an LED in which the length of the longest side is 1000 μm or more. Incidentally, the length of one side of the light emitting element LEM which is a general LED is, for example, 300 μm or more and 350 μm or less.

The protective layer OC is configured as an optically transparent layer that allows passage of a wavelength of light released from the light emitting element LEM. The protective layer OC includes silicon resin, for example. The protective layer OC allows passage of the light released from the light emitting element LEM without converting the wavelength of the light into another wavelength. The wavelength of the light passed through the protective layer OC is converted into another wavelength by the wavelength conversion layer RCL described later.

The light diffusion distance maintaining layer TLG is located above the plurality of light emitting elements LEM with the protective layer OC interposed therebetween.

The light diffusion distance maintaining layer TLG is a transparent resin layer including a material having one type of refractive index. For example, the light diffusion distance maintaining layer TLG is a transparent resin layer including one type of resin material, more specifically, a plate-like polycarbonate resin.

By using a plate-like polycarbonate resin as the light diffusion distance maintaining layer TLG, the protective layer OC and the wavelength conversion layer RCL are held at a regular interval.

The mini LED which is the light emitting element LEM emits light having high directivity. For this reason, when the plurality of light emitting elements LEM are turned on, there is a risk that the user will view these light emitting elements LEM as bright spot dot patterns. In order to prevent such a bright spot by the light emitting element LEM from being viewed, it is necessary to diffuse the emitted light having high directivity from the light emitting element LED to such an extent that the emitted light cannot be viewed.

The light diffusion distance maintaining layer TLG of the present embodiment has a sufficient thickness (distance in third direction Z) necessary for diffusing the emitted light from the light emitting element LEM in the third direction Z. For this reason, in the present embodiment, occurrence of undesired non-uniformity of light such as the bright spot is suppressed.

In addition, in the case of the conventional illumination device in which the optical path from the light emitted from the light emitting element LEM to the display panel PNL is short, light from adjacent light emitting elements LEM is not sufficiently mixed, and there is a risk that stripe-like non-uniformity caused by the brightness difference of the light becomes visible. In the present embodiment, the light diffusion distance maintaining layer TLG is located between the light emitting element LEM and the display panel PNL. As a result, the light emitted from the light emitting element LEM is diffused toward the display panel PNL in the process of passing through the light diffusion distance maintaining layer TLG, and is mixed with light from adjacent light emitting elements LEM. As a result, the brightness of light having passed through the light diffusion distance maintaining layer TLG is made uniform over the entire emission surface (entire emission surface corresponding to light emission region LA). Therefore, degradation of the illumination quality of the illumination device IL can be suppressed, and the illumination quality is improved.

As shown in FIG. 2, assuming that the pitch of segment regions SA in the first direction X and the second direction Y is a pitch P, and the thickness (length in third direction) of the light diffusion distance maintaining layer TLG is a thickness T, the thickness T is desirably ½ times or more the pitch P. That is, $T \geq (½) \times P$ holds. By defining the pitch between the segment regions SA and the thickness of the light diffusion distance maintaining layer TLG as described above, the emitted light from the light emitting element LEM is sufficiently diffused by the light diffusion distance maintaining layer TLG, and it is possible to obtain light with uniform brightness.

The wavelength conversion layer RCL as a wavelength conversion element is located above the light diffusion distance maintaining layer TLG. The wavelength conversion layer RCL includes, for example, quantum dots as a light emitting material, absorbs incident light such as light released by the light emitting element LEM, and can emit light having a wavelength longer than the wavelength of the absorbed light. For example, the light emitting element LEM is a blue LED having a main emission peak wavelength of 500 nm or less, and the wavelength conversion layer RCL is a phosphor that absorbs light emitted from the light emitting element LEM and emits light having a wavelength of 500 nm or more.

Incidentally, the wavelength conversion layer RCL is desirably disposed not between the light emitting element LEM and the light diffusion distance maintaining layer TLG but on the light diffusion distance maintaining layer TLG. In other words, the wavelength conversion layer RCL is preferably disposed behind the light diffusion distance maintaining layer TLG on the optical path of light released from the light emitting element LEM.

Here, it is considered to dispose the wavelength conversion layer RCL between the light emitting element LEM and the light diffusion distance maintaining layer TLG. Light emitted from the light emitting element LEM is diffused by passing through the wavelength conversion layer RCL in the vicinity of the light emitting element LEM, and then enters the light diffusion distance maintaining layer TLG to be naturally diffused. For this reason, in the wavelength conversion layer RCL, it is difficult for the emitted light from the light emitting element LEM to sufficiently reach a part relatively far from the light emitting element LEM in planar view, and the light diffusibility in the part cannot be sufficiently utilized, and as a result, there is a risk that the diffusibility will be poor.

In contrast, in a case where light from the light emitting element LEM first enters the light diffusion distance maintaining layer TLG, the light from the light emitting element LEM is naturally diffused radially in the process of passing through the light diffusion distance maintaining layer TLG, and then is further diffused by the wavelength conversion layer RCL. As a result, even at a position away from the light emitting element LEM in planar view, the light emitted from the light emitting element LEM sufficiently enters the wavelength conversion layer RCL, and is further diffused by the wavelength conversion layer RCL. As a result, the diffusibility is improved in such a configuration. Therefore, the light diffusion distance maintaining layer TLG is preferably closer to the light emitting element LEM than the wavelength conversion layer RCL.

The prism sheet PSM is located above the wavelength conversion layer RCL. In FIG. 2, the prism sheet PSM includes two refractive prism sheets PSM1 and PSM2 disposed orthogonal to each other. Note, however, that the prism sheet PSM may include a total reflection prism sheet instead of the refractive prism sheet PSM1. The total reflection prism sheet has a simple configuration and is excellent in light use efficiency and vertical light condensing property.

Light emitted from the prism sheet PSM is released toward the display panel PNL as illumination light, and illuminates the display panel PNL.

FIG. 3 shows the wiring board CBS and the plurality of light emitting elements LEM of the illumination device IL.

As shown in FIG. 3, the light emission region LA is divided into a plurality of segment regions SA. In the present embodiment, the plurality of segment regions SA are arranged in a matrix in the first direction X and the second direction Y. For example, segment regions SA are arranged in the first direction X and 32 segment regions SA are arranged in the second direction Y. Note, however, that the plurality of segment regions SA do not necessarily have to be arranged in a matrix as long as they are located adjacent to each other.

In FIG. 3, the segment region SA is a square having a side of 1 mm. Note, however, that the size and shape of the segment region SA are not limited to the above example.

The plurality of light emitting elements LEM are arranged in a matrix in the first direction X and the second direction Y. Note, however, that the plurality of light emitting elements LEM do not necessarily have to be arranged in a matrix, and may be disposed in a predetermined pattern.

As shown in FIG. 3, the pitch P between the segment regions SA corresponds to a distance between the centers of adjacent segment regions. Since the segment region SA is square, the pitch in the first direction X and the pitch in the second direction Y are the same. In the present embodiment, the pitch P of the segment regions SA is 1 mm.

In each of the plurality of segment regions SA, n (n>1) light emitting elements LEM are provided. In the present embodiment, four light emitting elements LEM are provided in each segment region SA. Note, however, that two, three, or five or more light emitting elements LEM may be provided in each segment region SA.

The four light emitting elements LEM provided in each segment region SA are connected in series. The light emitting elements LEM provided in different segment regions SA belong to different wiring systems, and are simultaneously or separately turned on and off by the driver DVM. For example, the driver DVM can turn on some of the plurality of light emitting elements LEM and turn off the others by a method called local dimming. As a result, the contrast ratio of an image displayed on the display panel PNL can be further increased.

Figure 4:
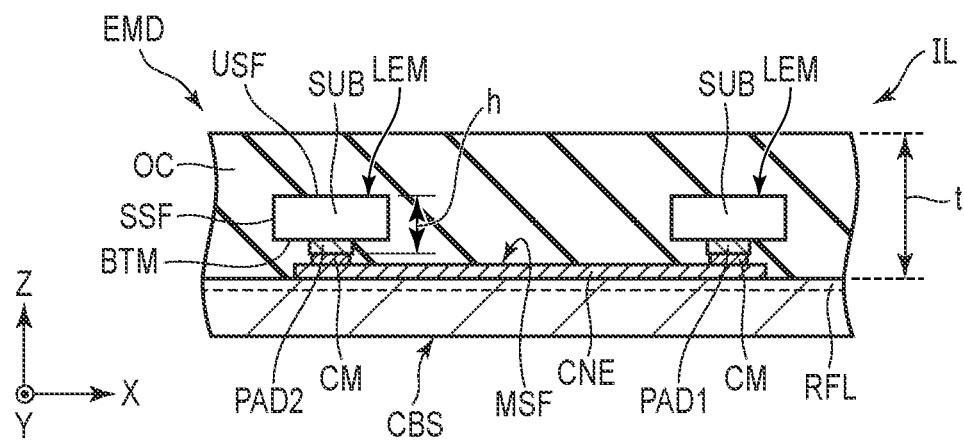
FIG. 4 is a cross-sectional view showing the illumination device IL taken along line A-A in FIG. 3.

FIG. 4 is a cross-sectional view showing the illumination device IL taken along line A-A in FIG. 3. FIG. 4 shows the wiring board CBS, the plurality of light emitting elements LEM, and the protective layer OC of the illumination device IL.

As shown in FIG. 4, the light emitting element LEM is mounted on the wiring board CBS by a method called flip chip bonding. In flip chip bonding, a bare chip cut out from a substrate and not packaged is connected to the wiring board CBS with a conductive material CM such as solder, gold, or an anisotropic conductive film.

In FIG. 4, SUB is an optically transparent substrate as a base, and the light emitting element LEM includes a pad PAD1 and a pad PAD2 on a surface (bottom surface BTM) of the substrate SUB facing the wiring board CBS. As will be described later, the light emitting element LEM has two pads PAD1 and PAD2, one of which is connected to the anode of the light-emitting diode from the bottom surface BTM side, and the other of which is connected to the cathode of the light-emitting diode from the bottom surface BTM side.

A connection electrode CNE is formed with a copper foil or the like on the wiring board CBS. The connection electrode CNE forms a part of the main surface MSF. The substrate SUB has a front surface (top surface) USF on the opposite side of the bottom surface BTM, and in flip chip bonding, the front surface USF of the light emitting element LEM is heated and pressed. By being heated and pressed from the front surface USF, the pads PAD1 and PAD2 are connected to the connection electrode CNE via the conductive material CM such as solder, gold, or an anisotropic conductive film.

Incidentally, since the front surface USF of the substrate SUB is heated and pressed, it is difficult to provide a fluorescent substance or the like on the front surface USF. Accordingly, after the light emitting element LEM is mounted on the wiring board CBS, the wavelength conversion layer RCL is provided separately from the light emitting element LEM.

In addition, unlike wire bonding, no connection unit is formed on the front surface USF of the substrate SUB, and the wiring line can be shortened. In wire bonding, since the wire is connected from the front surface to the wiring board, the length of the wire is equal to or longer than the thickness of the substrate SUB, whereas in flip chip bonding, the length of the wiring line is the distance from the bottom surface BTM of the substrate SUB to the wiring board CBS.

The wiring board CBS is provided with a light-reflective layer RFL in addition to the connection electrode CNE. The light-reflective layer RFL forms a part of the main surface MSF together with the connection electrode CNE. In the present embodiment, the light-reflective layer RFL is a white insulating layer. For this reason, as compared with a case where the color of the layer included in the main surface MSF of the wiring board CBS is a color other than white such as green or black, the light reflectance of the wiring board CBS can be increased, and the utilization efficiency of the light released from the light emitting element LEM can be increased.

The protective layer OC covers the main surface MSF and the plurality of light emitting elements LEM. The protective layer OC is in contact with the front surface USF and a side surface SSF of the light emitting element LEM (substrate SUB). The protective layer OC covers a connection unit between the connection electrode CNE and the pad PAD1 (or pad PAD2). The protective layer OC is located at least in the light emission region (LA). The wiring board CBS, the plurality of light emitting elements LEM, and the protective layer OC are included in a light source EMD together with the driver DVM.

Figure 5:
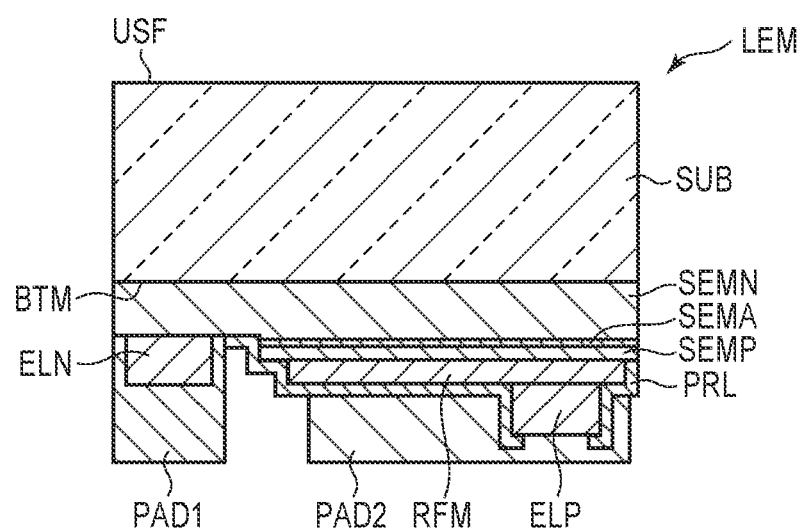
FIG. 5 is a cross-sectional view showing a light emitting element LEM taken along line B-B in FIG. 3.

Incidentally, in the present embodiment, a height h of the light emitting element LEM is 80 μm, and a thickness t of the protective layer OC is 0.3 mm. Here, an example of the structure of the light emitting element LEM will be described. FIG. 5 is a cross-sectional view showing the light emitting element LEM taken along line B-B in FIG. 3.

As shown in FIG. 5, the light emitting element LEM is a flip-chip type light-emitting diode element. The light emitting element LEM includes a transparent substrate SUB having an insulating property. The substrate SUB is, for example, a sapphire substrate. A crystal layer (semiconductor layer) in which an n-type semiconductor layer SEMN, an active layer (emitting layer) SEMA, and a p-type semiconductor layer SEMP are stacked in order is formed on the bottom surface BTM of the substrate SUB. In the crystal layer (semiconductor layer), a region containing a P-type impurity is the p-type semiconductor layer SEMP, and a region containing an N-type impurity is the n-type semiconductor layer SEMN. The material of the crystal layer (semiconductor layer) is not particularly limited, but the crystal layer (semiconductor layer) may contain gallium nitride (GaN) or gallium arsenide (GaAs).

A light reflective film RFM includes a conductive material and is electrically connected to the p-type semiconductor layer SEMP. A p-electrode ELP is electrically connected to the light reflective film RFM. An n-electrode ELN is electrically connected to the n-type semiconductor layer SEMN. The pad PAD1 covers the n-electrode ELN and is electrically connected to the n-electrode ELN. The protective layer PRL covers the n-type semiconductor layer SEMN, the active layer SEMA, the p-type semiconductor layer SEMP, and the light reflective film RFM, and covers a part of the p-electrode ELP. The pad PAD2 covers the p-electrode ELP and is electrically connected to the p-electrode ELP.

The illumination device IL and the display device DSP of the present embodiment are configured as described above.

According to the display device DSP according to the present embodiment configured as described above, the display device DSP includes the display panel PNL and the illumination device IL. The illumination device IL includes the wiring board CBS, the plurality of light emitting elements LEM, the protective layer OC, and the like. The plurality of light emitting elements LEM are independently driven in units of segment regions SA.

When local dimming is performed, it is desirable that one segment region SA emits light uniformly. It is necessary that the light amount is constant at each position in the area of one segment region SA (region surrounded by dotted line in FIG. 3), and that the boundary between two adjacent ON segment regions SA is not viewed. Furthermore, in a case where one segment region SA is turned on and another adjacent segment region SA is turned off, it is desirable that light leakage (halo effect) from the ON segment region SA does not occur in the OFF segment region SA.

In the segment region SA shown in FIG. 3, a number of light emitting elements LEM suitable for the area of the segment region SA are selected, and the light emitting elements LEM are disposed so as to emit light uniformly. Although it is known that light spreads radially, it is possible to prevent degradation of light amounts at the four corners of the square segment region SA by disposing the four light emitting elements LEM.

As described above, according to the present embodiment, an illumination device with improved illumination quality and a display device including the illumination device can be obtained.

Other Configuration Examples

FIG. 6 is a cross-sectional view showing another configuration example of the protective layer OC in the present embodiment. The configuration example shown in FIG. 6 is different from the configuration example shown in FIG. 4 in that a protective layer OC has an uneven surface.

The protective layer OC shown in FIG. 6 has a corrugated upper surface OCU as an example of the uneven shape. When the upper surface OCU of the protective layer OC has an uneven shape as described above, a light diffusion distance maintaining layer TLG does not adhere to the protective layer OC.

In a case where the light diffusion distance maintaining layer TLG and the protective layer OC are stacked while being adhered to each other, the interval between the light diffusion distance maintaining layer TLG and the protective layer OC may be locally reduced due to deflection caused by external force applied to the light diffusion distance maintaining layer TLG or the protective layer OC, or deflection or warpage of the light diffusion distance maintaining layer TLG or the protective layer OC. As described above, since the distance between the light diffusion distance maintaining layer TLG and the protective layer OC becomes non-uniform, there is a risk that a phenomenon called Newton ring will occur.

However, in the present configuration example, since the upper surface OCU of the protective layer OC has an uneven shape, the light diffusion distance maintaining layer TLG does not adhere to the protective layer OC. Therefore, generation of the Newton ring can be suppressed.

Incidentally, in FIG. 6, the uneven shape of the upper surface OCU of the protective layer OC is a corrugated shape, but the uneven shape is not limited thereto. The uneven shape may be, for example, a triangular shape or the like.

In the present configuration example, too, effects similar to those of the above embodiment can be obtained.

EXAMPLES

The inventors of the present application measured the optical property of the illumination device IL of the present embodiment. FIG. 7 is a diagram showing brightness profiles of the illumination device IL of the present example and an illumination device of a comparative example. Incidentally, the brightness shown in FIG. 7 is the front brightness of the illumination device. In addition, in FIG. 7, a brightness profile LPA of the illumination device IL of the present example is indicated by a solid line, and a brightness profile LPR of the illumination device of the comparative example is indicated by a dotted line.

In the present example, as described above, brightness measurement was performed for an illumination device having a segment region SA having a square shape with a side of 2 mm. In FIG. 7, the center of a segment region SA1 is set as a reference position (0 mm), the distance from the reference position toward the right side is indicated by a positive value, and the distance from the reference position toward the left side is indicated by a negative value.

As shown in FIG. 7, during the measurement, only light emitting elements LEM in one segment region SA1 located within the range of −1.0 mm to 1.0 mm were turned on, and the light emitting elements LEM in the remaining segment regions SA were turned off. For example, the light emitting elements LEM are turned off in a segment region SA2 located within a range of −3.0 mm to −1.0 mm, a segment region SA3 located within a range of 1.0 mm to 3.0 mm, a segment region SA4 located within a range of −5.0 mm to −3.0 mm, and a segment region SA5 located within a range of 3.0 mm to 5.0 mm.

In addition, as a comparative example, the optical property of an illumination device having three diffusion sheets instead of the light diffusion distance maintaining layer TLG was measured. The illumination device of the comparative example has the same configuration except that three diffusion sheets are provided instead of the light diffusion distance maintaining layer TLG.

First, whether or not bright spots of the plurality of light emitting elements LEM of the present example were viewed as a dot pattern was measured. As a result, in the illumination device of the present example, the bright spots of the light emitting elements LEM were not confirmed. Therefore, it was demonstrated that the light diffusion distance maintaining layer TLG can diffuse light emitted from the light emitting element LEM and uniformize the brightness of the light.

In addition, as shown in FIG. 7, in the brightness profile LPA of the present example and the brightness profile LPR of the comparative example, the brightness level is maximized at the center of the segment region SA1. However, the brightness of the present example was substantially 30% higher than that of the comparative example. This is considered to be because the light diffusion distance maintaining layer TLG is a transparent resin layer including a material having one type of refractive index, and unnecessary diffusion does not occur, so that the brightness increased. As described above, according to the present example, it is possible to obtain an illumination device capable of emitting light with higher brightness.

Figure 8:
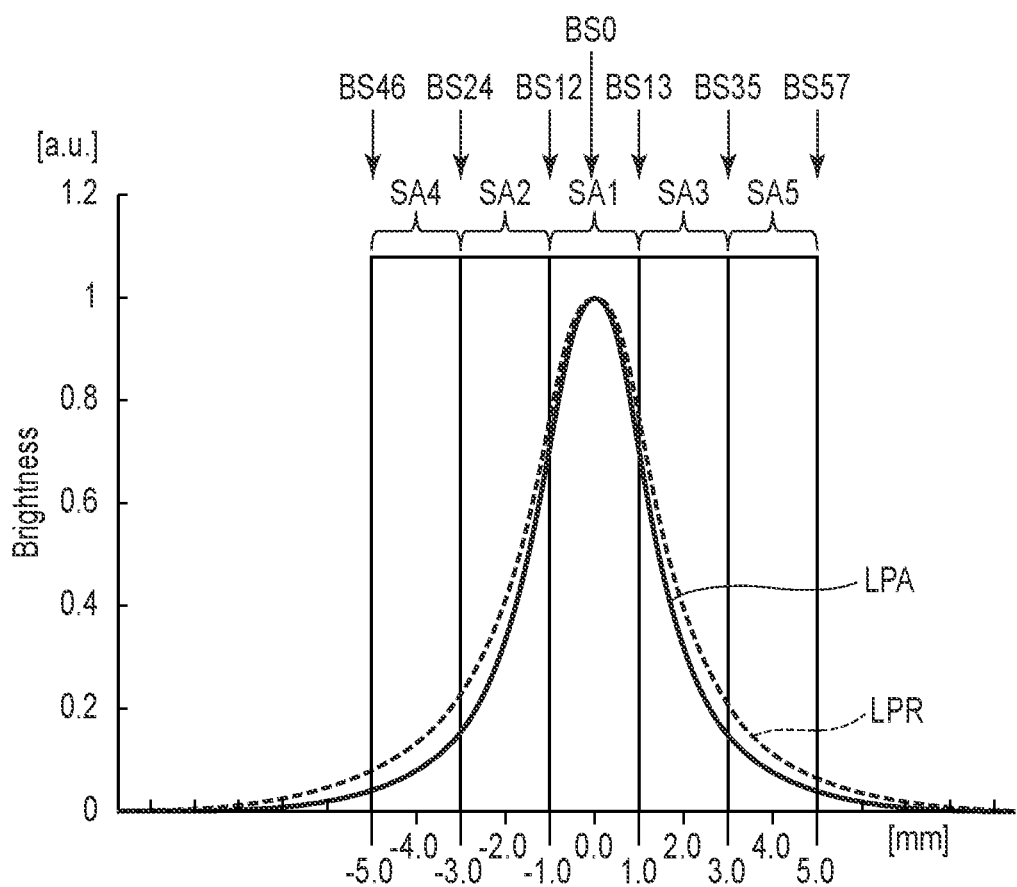
FIG. 8 is a diagram showing brightness profiles in the present example and a comparative example.

FIG. 8 is a diagram showing brightness profiles in the present example and a comparative example. In FIG. 8, the brightness of the example and the comparative example is normalized such that the brightness of the example at the reference position (0 mm) is 1. In addition, in FIG. 8, too, a brightness profile LPA of the illumination device IL of the present example is indicated by a solid line, and a brightness profile LPR of an illumination device of the comparative example is indicated by a dotted line.

Incidentally, in FIG. 8, the reference position is defined as a position BS0, the boundary between a segment region SA1 and a segment region SA2 is defined as a position BS12, the boundary between the segment region SA2 and a segment region SA4 is defined as a position BS24, the boundary between the segment region SA1 and a segment region SA3 is defined as a position BS13, and the boundary between the segment region SA3 and a segment region SA5 is defined as a position BS35.

In addition, the boundary between the segment region SA4 and an adjacent segment region SA6 (not shown) is defined as a position BS46, and the boundary between the segment region SA5 and an adjacent segment region SA7 (not shown) is defined as a position BS57.

Assuming that the brightness ratio of the reference position (0 mm) in the brightness profiles LPA and LPR shown in FIG. 8 is 100% (=1), the brightness ratios of the position BS12, the position BS24, the position BS46, the position BS13, the position BS35, and the position BS57 are shown in Table 1.

TABLE 1

| Brightness profile | Position | | | | | | |
|---|---|---|---|---|---|---|---|
| | BS46 | BS24 | BS12 | BS0 | BS13 | BS35 | BS57 |
| LPA | 2.8% | 12.0% | 71.4% | 100.0% | 63.2% | 10.6% | 2.6% |
| LPR | 5.9% | 19.6% | 77.3% | 100.0% | 72.2% | 18.3% | 5.4% |

With reference to FIG. 8 and Table 1, comparison results of the illumination device of the present example and the illumination device of the comparative example are shown.

As shown in FIG. 8 and Table 1, the brightness profile LPA of the present example is steeper than the brightness profile LPR of the comparative example. As described above, in the illumination device IL of the present example, it is possible to obtain light having a steeper brightness profile.

As shown in Table 1, in the present example, the brightness ratio decreases by 28.6% between the position BS0 as the reference position and the position BS12, that is, between the center and the end portion on the segment region SA2 side in the segment region SA1. On the other hand, in the comparative example, the brightness ratio decreases only by 22.7%.

In addition, in the present example, the brightness ratio decreases by 59.4% between the position BS12 and the position BS24, that is, between the end portion on the segment region SA1 side and the end portion on the segment region SA4 side in the segment region SA2. On the other hand, in the comparative example, the brightness ratio decreases only by 57.7%.

In addition, in the present example, the brightness ratio decreases by 36.8% between the position BS0 as the reference position and the position BS13, that is, between the center and the end portion on the segment region SA3 side in the segment region SA1. On the other hand, in the comparative example, the brightness ratio decreases only by 27.8%.

In addition, in the present example, the brightness ratio decreases by 52.6% between the position BS13 and the position BS35, that is, between the end portion on the segment region SA1 side and the end portion on the segment region SA5 side in the segment region SA3. On the other hand, in the comparative example, the brightness ratio decreases by 53.9%.

The decrease in the brightness ratio in the lit segment region SA1 and the adjacent segment regions SA2 and SA3 has been described above. As described above, in the present example, it has become clear that the brightness ratio decreases for a distance corresponding to one segment region SA as compared with the conventional example. That is, the present example shows that leakage of the light of the lit segment region SA1 to the adjacent segment region SA is suppressed.

As described above, in a case where local dimming is performed, it is desirable that light leakage from the ON segment region SA does not occur when other adjacent segment regions SA are OFF.

When the brightness profile is steep, light leakage from the ON segment region SA to the adjacent OFF segment region SA is suppressed. Therefore, the illumination device IL of the present example is an illumination device more suitable for performing local dimming. A display device including such an illumination device can further increase contrast.

As described above, according to the present example, it is possible to obtain an illumination device with improved illumination quality and a display device including the illumination device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An illumination device comprising:
   light emitting elements;
   a protective layer covering the light emitting elements and having an uneven surface;
   a transparent resin plate on the uneven surface, a main surface of the transparent resin plate facing the light emitting elements;
   a wavelength conversion layer on the transparent resin plate; and
   a prism sheet on the wavelength conversion layer, wherein
   a diffusion sheet is not provided above the light emitting elements,
   the uneven surface has protruding parts, and
   the protruding parts are on and in direct contact with the main surface.

2. The illumination device according to claim 1, wherein the protective layer extends continuously across the light emitting elements.

3. The illumination device according to claim 1, wherein the protruding parts are in contact with the main surface in a pattern extending continuously across the protective layer.

4. The illumination device according to claim 1, wherein the transparent resin plate is formed of the polycarbonate resin.

5. The illumination device according to claim 1, wherein a diffusion sheet is not provided above the transparent resin plate.

6. The illumination device according to claim 1, wherein
   an optical member is not provided above the transparent resin plate, and
   the optical member diffuses light of the light emitting elements more strongly than the wavelength conversion layer and the prism sheet.

7. The illumination device according to claim 1, further comprising a wiring board on which the light emitting elements are disposed,
   wherein the wiring board faces the main surface.

8. The illumination device according to claim 1, wherein the wavelength conversion layer includes a quantum dot.

9. An illumination device comprising:
   light emitting elements;
   a transparent resin plate on an uneven surface, a main surface of the transparent resin plate facing the light emitting elements;
   a wavelength conversion layer on the transparent resin plate; and
   a prism sheet on the wavelength conversion layer, wherein
   an optical member is not provided above the light emitting elements, the optical member diffusing light of the light emitting elements more strongly than the wavelength conversion layer and the prism sheet.

10. The illumination device according to claim 9, further comprising a protective layer between the light emitting elements and the transparent resin plate,
    wherein the protective layer covers the light emitting elements and includes the uneven surface which is in contact with the main surface.

11. The illumination device according to claim 10, wherein
    the uneven surface has protruding parts, and
    the protruding parts are in contact with the main surface.

12. The illumination device according to claim 9, further comprising a wiring board on which the light emitting elements are disposed, wherein
    the wiring board faces the main surface,
    a main surface of the wiring board is divided into segment regions,
    n (n>1) light emitting elements are provided in each of the segment regions,
    the light emitting elements are independently driven in units of the segment regions, and
    a thickness of the transparent resin plate is ½ times or more a pitch of two of the segment regions, the two being adjacent to each other.

13. A display device comprising:
    a display panel; and
    an illumination device which illuminates the display panel, and comprises:
    light emitting elements;
    a transparent resin plate on an uneven surface, a main surface of the transparent resin plate facing the light emitting elements;
    a wavelength conversion layer on the transparent resin plate; and
    a prism sheet on the wavelength conversion layer, wherein
    an optical member is not provided between the light emitting elements and the display panel, the optical member diffusing light of the light emitting elements more strongly than the wavelength conversion layer and the prism sheet.

14. The illumination device according to claim 13, further comprising a protective layer between the light emitting elements and the transparent resin plate,
wherein the protective layer covers the light emitting elements and includes the uneven surface which is in contact with the main surface.

15. The illumination device according to claim 14, wherein
the uneven surface has protruding parts, and
the protruding parts are in contact with the main surface.

16. The illumination device according to claim 13, further comprising a wiring board on which the light emitting elements are disposed, wherein
the wiring board faces the main surface,
a main surface of the wiring board is divided into segment regions,
n (n>1) light emitting elements are provided in each of the segment regions,
the light emitting elements are independently driven in units of the segment regions, and
a thickness of the transparent resin plate is ½ times or more a pitch of two of the segment regions, the two being adjacent to each other.

17. The illumination device according to claim 1, wherein the transparent resin plate has one type of refractive index.

18. The illumination device according to claim 1, wherein refractive index of the transparent resin plate is uniform.

19. The illumination device according to claim 9, wherein the transparent resin plate has one type of refractive index.

20. The display device according to claim 13, wherein the transparent resin plate has one type of refractive index.

* * * * *